(12) United States Patent
Kurian et al.

(10) Patent No.: US 11,709,757 B1
(45) Date of Patent: Jul. 25, 2023

(54) SYSTEMS AND METHODS FOR INTEGRATING SCRIPT DEVELOPMENT AND SCRIPT VALIDATION PLATFORMS BASED ON DETECTED DEPENDENCY BRANCHES IN SCRIPT CODE

(71) Applicant: Citibank, N.A., New York, NY (US)

(72) Inventors: Robin Jose Kurian, Carrollton, TX (US); Joseph Julius Bosco Arockia Dass, Chennai (IN); Balaji Kobula Madhavan, Prosper, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/180,208

(22) Filed: Mar. 8, 2023

(51) Int. Cl.
*G06F 11/36* (2006.01)

(52) U.S. Cl.
CPC ...... *G06F 11/3604* (2013.01); *G06F 11/3684* (2013.01)

(58) Field of Classification Search
None
See application file for complete search history.

(56) References Cited

U.S. PATENT DOCUMENTS

| | | | | |
|---|---|---|---|---|
| 8,689,177 B2* | 4/2014 | Mahajan | | G06F 8/10 717/124 |
| 9,471,478 B1* | 10/2016 | Bhuiya | | G06F 11/3684 |
| 2005/0166094 A1* | 7/2005 | Blackwell | | G06F 11/3664 714/38.14 |
| 2007/0094542 A1* | 4/2007 | Bartucca | | G06F 11/3688 714/38.1 |
| 2013/0152047 A1* | 6/2013 | Moorthi | | G06F 11/3688 717/124 |
| 2019/0196952 A1* | 6/2019 | Manchiraju | | G06F 11/3676 |
| 2021/0042217 A1* | 2/2021 | Hwang | | G06F 11/3604 |
| 2021/0133089 A1* | 5/2021 | Khillar | | G06F 16/9024 |

OTHER PUBLICATIONS

T. T. Aye et al., "Layman Analytics System: A Cloud-Enabled System for Data Analytics Workflow Recommendation," in IEEE Transactions on Automation Science and Engineering, vol. 14, No. 1, pp. 160-170, Jan. 2017, doi: 10.1109/TASE.2016.2610521. (Year: 2017).*

L. A. M. C. Carvalho, K. Belhajjame and C. B. Medeiros, "Converting scripts into reproducible workflow research objects," 2016 IEEE 12th International Conference on e-Science (e-Science), Baltimore, MD, USA, 2016, pp. 71-80, doi: 10.1109/eScience.2016.7870887. (Year: 2016).*

\* cited by examiner

*Primary Examiner* — Andrew M. Lyons
(74) *Attorney, Agent, or Firm* — Perkins Coie LLP

(57) ABSTRACT

Systems and methods provide for an integrated script development and script validation platform. The integrated script development and script validation platform archives data in a way such that the dependencies between contributions of code strings (e.g., script sets) are detected and recorded. That is, the systems and methods detect dependency branches in the script code of script sets. By doing so, the systems and methods may identify individual performance characteristics for a given script set as well as determine the overall impact on the application itself.

20 Claims, 8 Drawing Sheets

Summarized Testing Org View
*(Click on the Manager/Domain name to filter the other 2 Viz)*

| Domain Name | Domain Leader Name | Manager Name | 2.HIGH | 3.MEDIUM | 4.LOW | Grand Total |
|---|---|---|---|---|---|---|
| Grand Total | | | 619 | 725 | 173 | 1,590 |
| Customer Management | Vazquez, Marjory | Reyes, Noel | 1 | | | 1 |
| | | Barringer, Alexis | 1 | 1 | | 2 |
| | | Cong, Songyuan | 7 | 1 | | 8 |
| Data Analytics | Granados, Porcio | Kurian, Robin | 1 | 7 | | 8 |
| | | Reddem, Padma Priya | 67 | 110 | | 179 |
| | Kurian, Robin | Manian, Rajendran | 2 | 10 | 1 | 13 |
| Digital | Bose, Priyam | Tumakuntala, Ajay | 5 | 11 | 5 | 21 |
| | Logan, Kari | Sharma, Priyanka | 3 | 3 | | 6 |
| | Rao, Surya | Nagai Rajendran, Arjun | 2 | | | 2 |
| | | Boinipelly, Anusha | 1 | 4 | | 5 |
| | Srinivasan, Sangeetha | Kannaboina, Krishna | 20 | 26 | 9 | 55 |
| | | Thai, Lisa | 4 | | | 4 |
| | Veerasami, Anantha | Keene, Kelly | 11 | 5 | | 20 |

FIG. 1B

| Calender Month KPIs | Goals | January | February | March |
|---|---|---|---|---|
| %Automated Executed | >=85 | 91.05% | 92.55% | 90.14% |
| %Automation Feasible |  | 99.33% | 99.17% | 99.09% |
| Defect Reopen Rate | <=10 | 1.91% | 1.09% | 1.39% |
| Invalid Defect % | <=10 | 1.50% | 1.12% | 2.15% |
| Defect Turnaround Showstopper | <=3 | 9,488 | 6,924 | 7,237 |
| Defect Turnaround High | <=5 | 9,020 | 7,161 | 8,051 |
| Qa Hours Lost |  | 3,502 | 4,563 | 4,628 |
| Defect Density | <=4 | 1.35% | 1.99% | 1.76% |

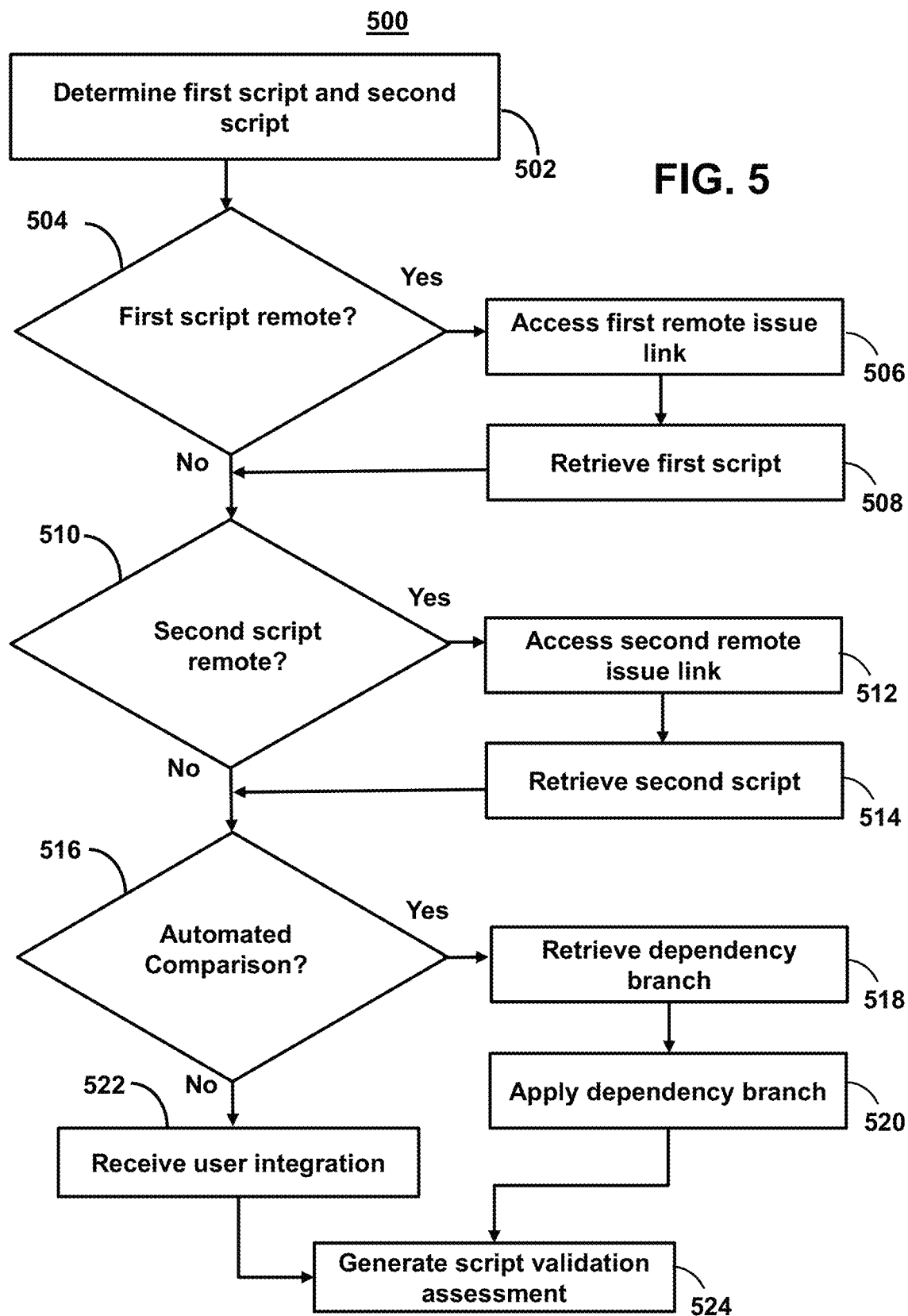

SYSTEMS AND METHODS FOR INTEGRATING SCRIPT DEVELOPMENT AND SCRIPT VALIDATION PLATFORMS BASED ON DETECTED DEPENDENCY BRANCHES IN SCRIPT CODE

BACKGROUND

Software programming typically involves multiple streams of code interacting with each other to perform different functions. These interactions may comprise instructions for actions to be performed, specific data sources to access, and/or particular conditions to be enforced. As such, even simple software applications comprise numerous code strings with numerous dependencies on other code strings to produce a given result for the application. Because each code string is dependent on the other, inefficiencies in one code string (or the combination of inefficiencies, lack of synergies, etc., in many code strings) may lead to low performance for the application.

SUMMARY

Accordingly, systems and methods are described herein for novel uses and/or improvements to script development for software applications. For example, due to the complexity of coding, most coding operations for a given component of a larger application are siloed to users with a specific expertise in coding the relevant component. However, because each code string for each component is developed independently and/or may include operations that are unknown to the developers of other code strings, detecting inefficiencies in code strings and, in particular, detecting inefficiencies in the overall functioning of an application based on a combination of code strings is difficult.

In view of this difficulty, conventional systems rely on bifurcated development and validation platforms for software development. For example, a conventional system may provide a central repository for storing contributions of code strings for an application and a separate engine for validating and/or applying rules to the submitted contributions. The benefit of such an approach is that the separate engine may apply a common set of validation parameters and rules sets to all submitted contributions. While this bifurcated development approach ensures that all contributions have the validation parameters equally applied, it provides no mechanism for determining an overall effect of a code string on an application or how a given code string is intertwined with other code strings in the application.

In contrast to this bifurcated development approach, the systems and methods provide for an integrated script development and script validation platform. Notably, the integrated script development and script validation platform archives data in a novel way such that the dependencies between contributions of code strings (e.g., script sets) are detected and recorded. That is, the systems and methods detect dependency branches in the script code of script sets. By doing so, the systems and methods may identify individual performance characteristics for a given script set as well as determine the overall impact on the application itself.

Furthermore, upon detecting the dependencies of script sets, the system may determine particular script attributes (e.g., a particular data value, algorithm, function type, etc.) that may improve the performance characteristics of the script sets. That is, the system may generate optimizations for each of the scripts sets to optimize its performance. Additionally, as the manner in which each individual script set depends on other script sets for the functioning of the application is known, the system may optimize the script attributes for one or more script sets according to their effect on the application's performance.

For example, in view of the technical challenges described above, the systems and methods recite a specific platform architecture that allows the platform to accommodate complex algorithms, the use of specific data sets, individual techniques of preparing data, and/or training the script sets. For example, the script validation platform includes a workflow of script dependencies for script sets. The script validation platform may then iterate through the workflow of script dependencies along dependency branches that may be either automatically selected or selected based on user inputs. For example, the script validation platform may provide an initial assessment of an inputted script set's performance but also allow a user of the script validation platform to select one or more script set attributes (e.g., data preparation techniques, algorithms, validation metrics, etc.) for optimizing. Based on traversing the workflow of script dependencies, the system may accumulate enough information to provide native data (e.g., performance characteristics) for an initial first script set and a second recommended script set (e.g., predicted values, trends, graphs, plots, etc.) as well as assessment data that describes, in a human-readable format, a relationship between the native data for the first script set and the second script set (e.g., how the results of the first script set and second script set compare).

In some aspects, systems and methods for integrating script development and script validation platforms based on detected dependency branches in script code are described. For example, the system may receive, via a user interface, a user request to perform a script validation assessment on a first application using a script validation platform. The system may retrieve a first script set for the first application, wherein the first script set defines a first workflow of script dependencies for the first application. The system may retrieve a second script set that has been automatically generated by the script validation platform, wherein the second script set defines a second workflow of script dependencies for inserting at a dependency branch of the first workflow of script dependencies. The system may determine, based on the second script set, the dependency branch of the first workflow of script dependencies for automatically generating the script validation assessment. The system may generate the script validation assessment based on the first script set and the second script set, wherein the script validation assessment indicates a performance level of the first application using the second script set. The system may receive, via the user interface, a user selection of the script validation assessment. The system may, in response to the user selection of the script validation assessment, generate for display, on the user interface, native data, for the first script set and the second script set and assessment data that describes, in a human-readable format, a relationship between the native data for the first script set and the second script set.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 1A-C show an illustrative user interface for an integrated script development and script validation platform, in accordance with one or more embodiments.

FIG. 5 shows a flowchart of the steps involved in generating a script validation assessment in a script validation platform, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
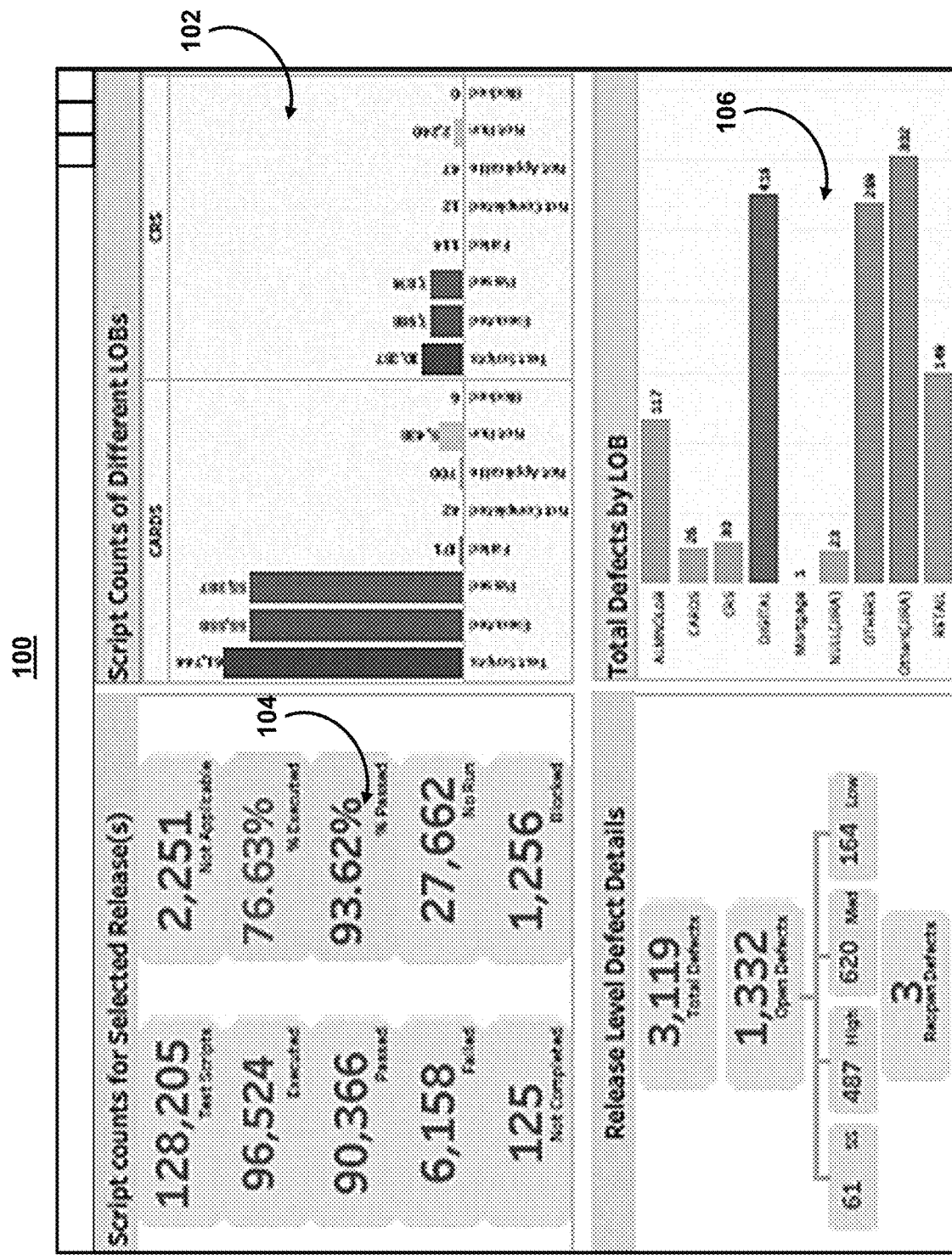

FIG. 1A shows an illustrative user interface for an integrated script development and script validation platform, in accordance with one or more embodiments. For example, the system and methods described herein may generate for display, on a local display device, a user interface for a script validation platform. As referred to herein, a "user interface" may comprise a human-computer interaction and communication in a device and may include display screens, keyboards, a mouse, and the appearance of a desktop. For example, a user interface may comprise a way a user interacts with an application or a website.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but it can also be part of a live performance. Furthermore, user-generated content may include content created and/or consumed by a user. For example, user-generated content may include content created by another but consumed and/or published by the user.

User interface 100 may comprise a user interface for a script validation platform. In some embodiments, a script validation platform may include a script validation platform that integrates multiple other script validation platforms (e.g., a script set development control system). Through user interface 100, the script validation platform may receive a user request to access a script validation assessment (e.g., assessment 102) and/or perform one or more operations, such as selecting script sets for validation and/or applying parameters to the validation (e.g., setting independent variables, uploading script sets, and/or selecting output settings). The system may output an assessment that includes a plurality of information types, such as textual information (e.g., information 104), graphical information (e.g., information 106), and/or other information.

In some embodiments, user interface 100 may comprise an easily understandable dashboard to provide the entire happening of a script release. User interface 100 may also provide email snapshots of a home page, which may provide summarized info on script execution/Defects/Requirement traceability/Regression coverage as soon as the data is refreshed. A user interface may be available to users enabling them to have a holistic view of the status at a point in time, which is completely automated. User interface 100 may provide a plurality of icons, the selection of which takes users directly to the server, where the users are provided with multiple drill-down options in a seamless approach.

In some embodiments, user interface 100 may allow a user to select one or more script set attributes. Script set attributes may include any characteristic of a script set. These characteristics may comprise a type of data used, an algorithm used, data preparation and/or selection steps, and/or any other characteristic of one script set that distinguishes it from another. The system may also present information about the script development process, as shown in FIG. 1B. For example, the system may present information about users, roles, and/or progress indicators for script development, as shown in user interface 130.

As shown in FIG. 1B, user interface 130 allows for tracking and mitigating defects in pain points as a test manager (e.g., user) because it acts as a direct threat for sign-off and implementation of any release. For example, user interface 130 may provide a key functionality to filter the details of script production based on the selection of a domain or a manager making the view specific for their tracking, enabling them to track in an efficient way.

As shown in FIG. 1C, user interface 150 may generate for display data related to a script validation platform. For example, the system may store native data corresponding to fields of the script validation platform. The native data may include data related to one or more dependencies or dependency branches in a workflow of script dependencies that comprises a first script set of the script validation platform. For example, the first script set may comprise a series of steps that the script validation platform iterates through to test the validating of any inputted script set. The series of steps may include one or more dependencies (e.g., specific operations, functions, etc.) applied while testing an inputted script set. The first workflow may also have dependency branches. As the first script set iterates through its dependencies, it may determine to follow one dependency branch over another. For example, each dependency branch may correspond to a particular type of inputted script set, a particular script set attribute of an inputted script set, data inputs of an inputted script set, etc. The dependency branches for the workflow may be comprehensive for any type of inputted script set that is detected. For example, the dependency branches may have branches devoted to every type of script set. Then, for each script set attribute, data input, etc., the system iterates along specific branches (or sub-branches) corresponding to each script set attribute, data input, etc., corresponding to an inputted script set. Through this structure, the script validation platform may receive different types of script sets and provide validations therefor.

User interface 150 also includes native data (e.g., data 108) for a plurality of script sets. Native data or native data formats may comprise data that originates from and/or relates to a respective script set, the script validation platform, and/or their respective plugins. In some embodiments, native data may include data resulting from native code, which is code written specifically for a given script set, the script validation platform, and a respective plugin designed therefor. For example, as shown in user interface 150, the system may generate a graph, which may comprise native data. In some embodiments, native data for multiple script sets may be displayed simultaneously (e.g., in a side-by-side comparison).

For example, the system may generate a benchmark script set (or a benchmark rating, such as rating 110) based on the native code and/or dataset of one or more script sets. The system may then compare the benchmark script set to the one or more plurality of script sets. For example, the benchmark script set may comprise a script set generated by the system based on the native code and/or dataset of one or more script sets of the previously validated script sets. For example, the native code and/or dataset of one or more script sets may comprise the data set upon which the other script sets were trained, tested, and/or validated. For example, the benchmark script sets may also share one or more script set attributes with the one or more script sets of the previously validated script sets. However, the benchmark script set may also include different script set attributes. For example, the benchmark script set may include a script set attribute (e.g., a specific data preparation, algorithm, architecture, etc.) that differs from the one or more script sets of the previously validated script sets. Based on these differences, the benchmark script set may generate different results from the originally validated script set. These differences may then be compared using assessment data. For example, in some embodiments, assessment data may comprise quantitative or qualitative assessments of differences in data. As shown in user interface 150, this assessment data may comprise color coding (e.g., color coding 112), which represents a difference in the performance of script sets.

In some embodiments, native data may include source code for a script set. For example, in some embodiments, the system may allow a user to update and/or edit the source code for an inputted script set. For example, the system may receive a user modification to the source code for an inputted script set and then store the modification to the source code for an inputted script set. The system may then generate for display the inputted script set (or native data for the inputted script set) based on the modification to the source code. For example, the system may allow users having a given authorization to edit source code subject to that authorization. In such cases, the source code may have read/write privileges. Upon generating the source code for display, the system may verify that a current user has one or more read/write privileges. Upon verifying the level of privileges, the system may grant the user access to edit the source code.

User interface 150 may also include other assessment data. Assessment data may be presented in any format and/or representation of data that can be naturally read by humans. In some embodiments, the assessment data may appear as a graphical representation of data. For example, the assessment data may comprise a graph of the script validation assessment and/or a level of performance of a script set. In such cases, generating the graph may comprise determining a plurality of script validation assessments for different script sets and graphically representing a relationship of the plurality of script validation assessments. In some embodiments, the relationship of the native data to the script validation assessment may comprise a graphical display describing a hierarchal relationship of the first workflow of script dependencies and the second workflow of script dependencies. For example, the script validation platform may indicate differences and/or provide recommendations for adjustments to an inputted script set.

User interface 150 may correlate with all source systems, do all complex calculations, and automatically generate the native data and/or assessment data to be submitted to the managing director level in a single view for the entire year, along with threshold notations. User interface 150 may also provide additional drill-down functionality to check the performance of individual managers/teams.

Figure 2:
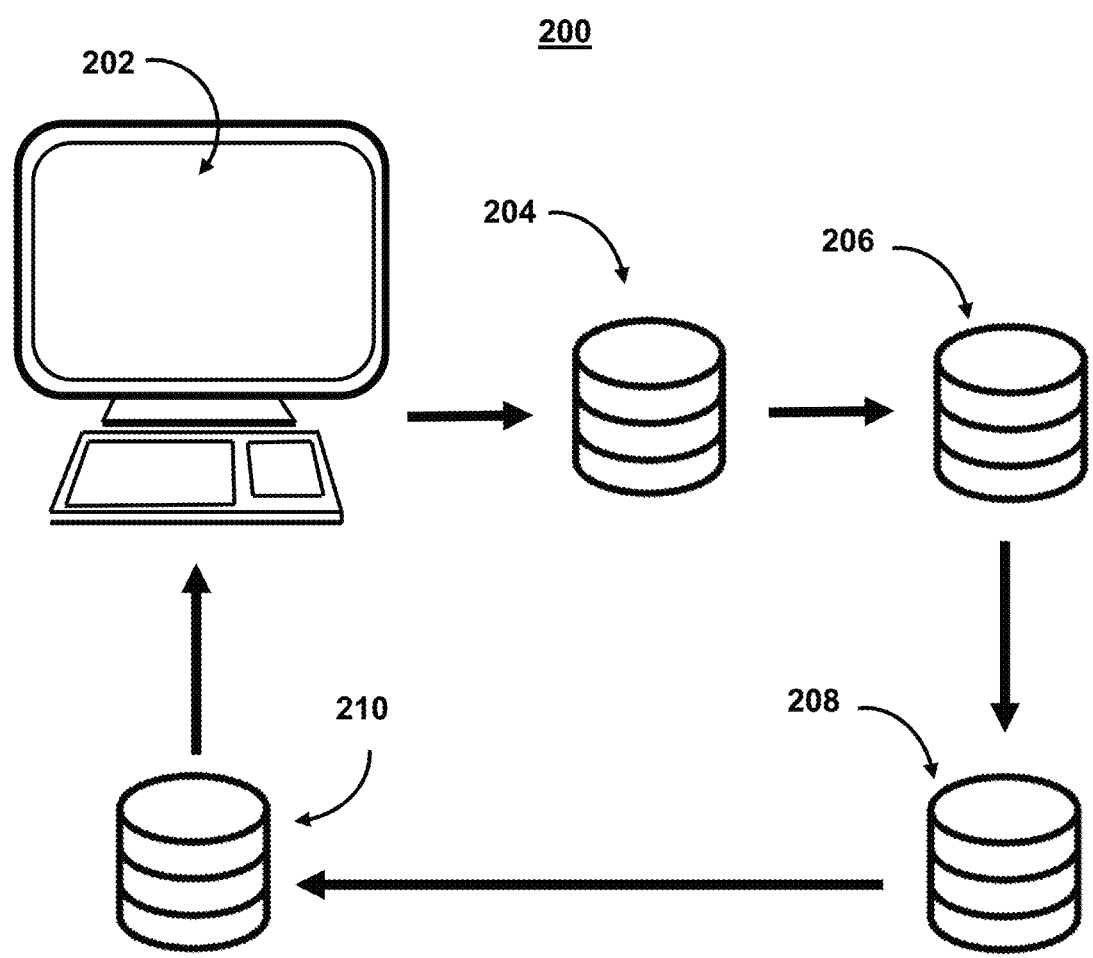
FIG. 2 shows an illustrative diagram of an architecture for an integrated script development and script validation platform, in accordance with one or more embodiments.

FIG. 2 shows an illustrative diagram of an architecture for an integrated script development and script validation platform, in accordance with one or more embodiments. For example, system 200 may provide a system for integrating script development and script validation platforms based on detected dependency branches in script code.

System 200 includes engine 202. Engine 202 may comprise an engine for a fully automated application with end-to-end script development capabilities that may require no manual intervention for tracking and monitoring the lifecycle of script testing. For example, engine 202 may provide testing from the creation of the test script to execution and the corresponding defect lifecycle in a systematic way (e.g., on a release level, month level, manager, organization, etc., on a single platform). Engine 202 assist management in addressing the issues for release management but also in tracking the capacity planning and productivity of the resources in the same space, which may help the entire management in the proper decision-making process by providing information for multiple process and various sources in one place and allow monitoring for the entire organization activity without leaving the platform. Engine 202 may also provide users with rich visuals, which not only provide the entire status on a snapshot but also assists in enabling swift decision-making. Engine 202 may also provide a user with the best option to drill down the data on multiple levels for a better understanding of the data and process.

Engine 202 may provide a reporting dashboard that transmits information (e.g., via an extension file, HTTPS protocol, and/or URL whitelist) to server 204. Server 204 and server 206 may comprise web components. Server 204 may transmit certificates from a certificate authority to server 206. Server 206 may then transmit information to server 208. Server 208 may use a SQL server to enable the transaction. Notably, this would not be present in a normal SQL server. Server 208 may generate a transaction replica, which is transmitted to server 210. Updates to server 210 may then be fed back to engine 202.

For example, transactional replication is a SQL Server technology that is used to replicate changes between two databases. These changes can include database objects like tables (primary key is required), stored procedures, views, and so on, as well as data. The system may use transaction replication to generate dashboard views (e.g., as described in FIGS. 1A-C). Additionally, the use of transaction replication allows for underlying data (e.g., native data for one or more script sets) to be updated in real-time.

Figure 3A:
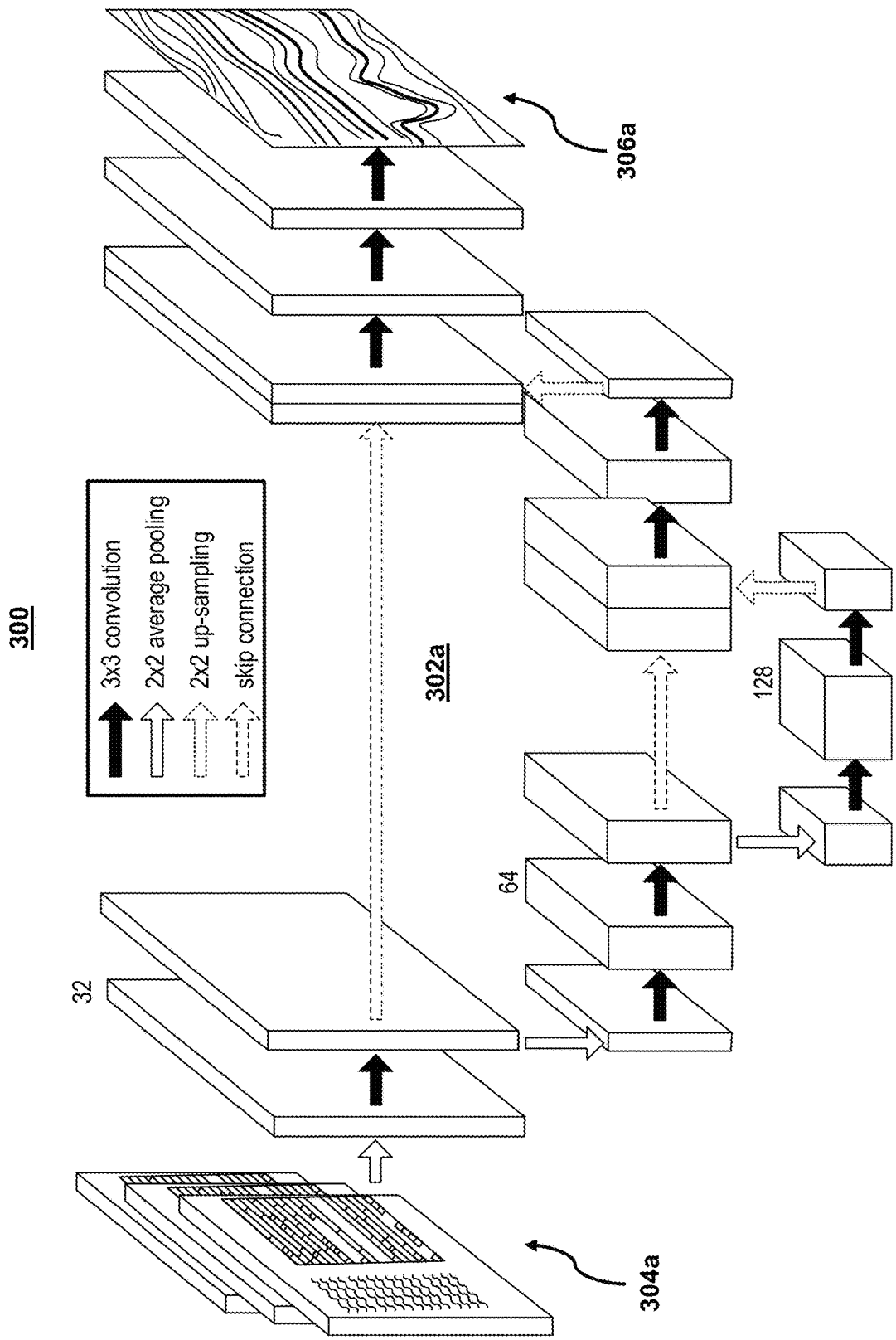
FIGS. 3A-B show illustrative components for a system used to provide an integrated script development and script validation platform, in accordance with one or more embodiments.

FIG. 3A shows illustrative components for a system used to provide an integrated script development and script validation platform, in accordance with one or more embodiments. System 300 also includes model 302a, which may be a machine learning model, artificial intelligence model, etc. (which may be referred to collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a script set, script attribute, dependency branch for insertion, etc.). For example, the model may be trained on historic performance level data that is labeled with script attributes at different dependency branches that resulted in respective performance levels.

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, model 302a may be trained to generate better predictions.

In some embodiments, the model (e.g., model 302a) may automatically perform actions based on outputs 306a. In some embodiments, the model (e.g., model 302a) may not perform any actions. The output of the model (e.g., model 302a) may be used to predict a script set, script attribute, dependency branch for insertion, etc.

Figure 3B:
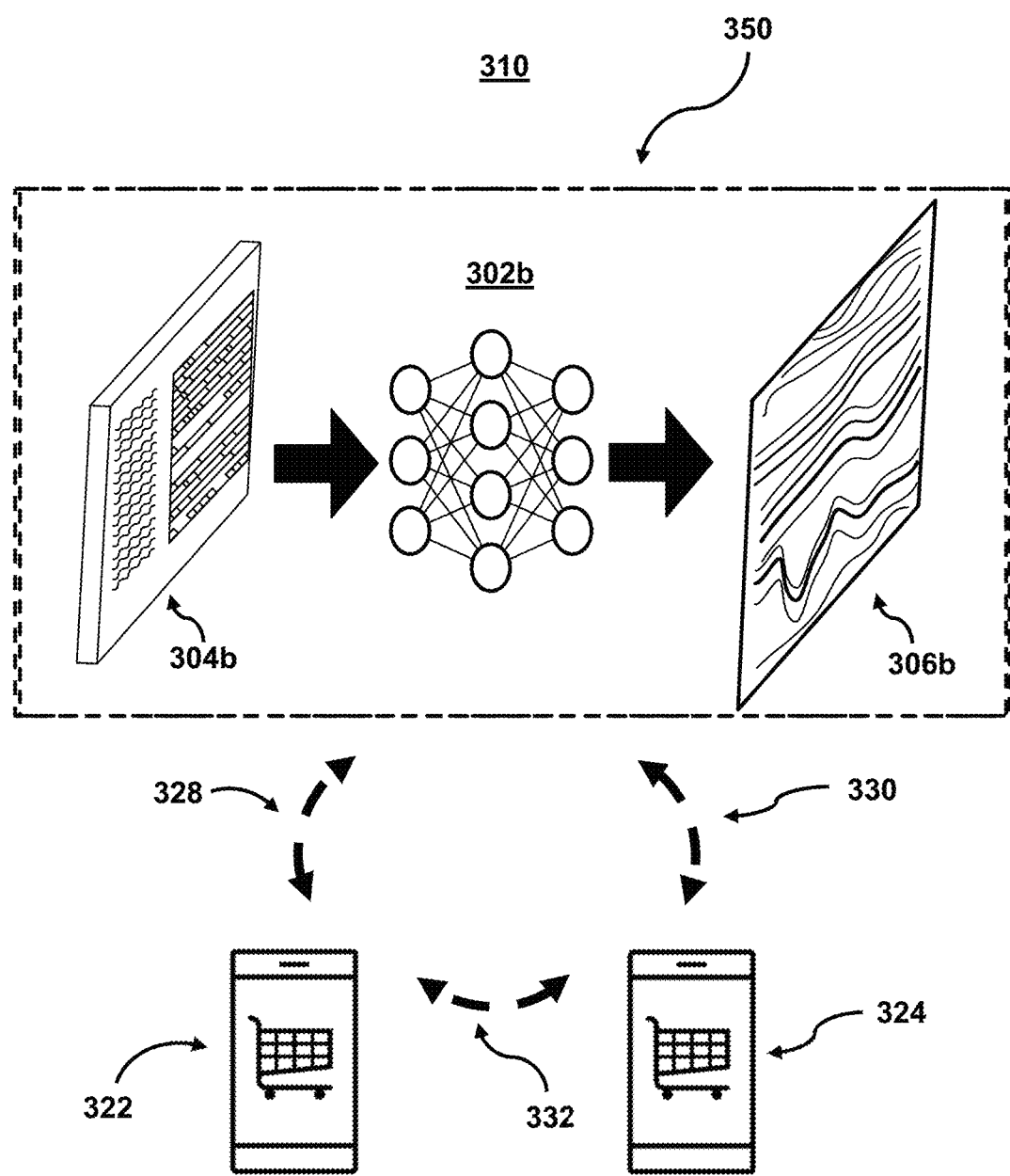

FIG. 3B shows illustrative components for an integrated script development and script validation platform. As shown in FIG. 3B, system 310 may include mobile device 322 and mobile device 324. While shown as a smartphone, respectively, in FIG. 3B, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 310 may also include cloud components. For example, cloud components may be implemented as a cloud computing system and may feature one or more component devices. It should be noted that while one or more operations are described herein as being performed by particular components of system 310, these operations may, in some embodiments, be performed by other components of system 310. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 310 and/or one or more components of system 310.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 310 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on mobile device 322 or mobile device 324. Alternatively, or additionally, API layer 350 may reside on one or more of cloud components. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is a strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDoS protection, and API layer 350 may use RESTful APIs as standard for external integration.

As shown in FIG. 3B, in some embodiments, model 302b may be trained by taking inputs 304b and providing outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem-solving, as compared to traditional computer programs. During training, an output layer of model 302b may correspond to a classification of model 302b, and an input known to correspond to that classification may be input into an input layer of model 302b during training. During testing, an input without a known classification may be input into the input layer, and a determined classification may be output. For example, the model may be trained on historic performance level data that is labeled with script attributes at different dependency branches that resulted in respective performance levels.

In some embodiments, model 302b may include multiple layers (e.g., where a signal path traverses from front layers to back layers). In some embodiments, backpropagation techniques may be utilized by model 302b, where forward stimulation is used to reset weights on the "front" neural units. In some embodiments, stimulation and inhibition for model 302b may be more free-flowing, with connections interacting in a more chaotic and complex fashion. During testing, an output layer of model 302b may indicate whether or not a given input corresponds to a classification of model 302b (e.g., a script set, script attribute, dependency branch for insertion, etc.).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also, as shown, model 302b may comprise fully connected layers that connect every neuron in one layer to every neuron in another layer.

Figure 4:
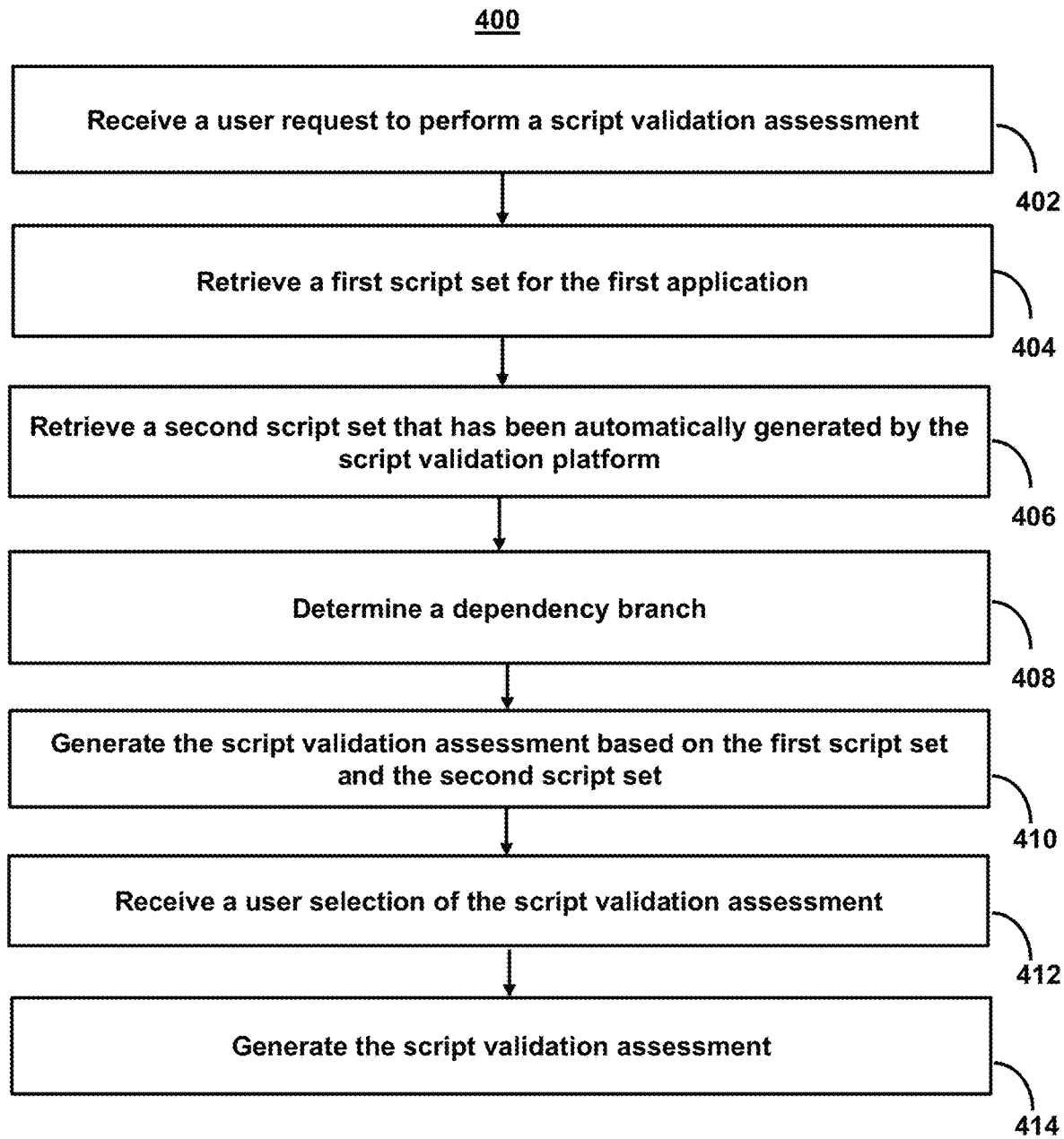
FIG. 4 shows a flowchart of the steps involved in integrating script development and script validation platforms based on detected dependency branches in script code, in accordance with one or more embodiments.

FIG. 4 shows a flowchart of the steps involved in integrating script development and script validation platforms based on detected dependency branches in script code. For example, process 400 may represent the steps taken by one or more devices, as shown in FIG. 2, when integrating script development and script validation platforms based on detected dependency branches in script code. In some embodiments, process 400 may be combined with one or more steps of process 500 (FIG. 5). For example, process 400 may relate to a script validation platform that may store native data corresponding to fields of script development and assessment data (e.g., viewable through a user interface (e.g., user interface 100 (FIG. 1A))).

At step 402, process 400 receives (e.g., using one or more components as described in FIG. 2) a user request to perform a script validation assessment. For example, the system may receive (e.g., via a user interface 100 (FIG. 1A)) a user request to perform a script validation assessment, on a first application, using a script validation platform. For example, the system may receive a user query to view information about the performance of an application using the script validation platform. For example, the system may receive a user query for the script validation platform, determine that a response to the user query is based on a dependency in a first workflow, retrieve native dependency data for the dependency, and generate for display the response based on the native dependency data.

At step 404, process 400 retrieves (e.g., using one or more components as described in FIG. 2) a first script set for the first application. For example, the system may retrieve a first script set for the first application, wherein the first script set defines a first workflow of script dependencies for the first application. In some embodiments, the first data script set may comprise a data organization, management, and storage format that enables efficient access and modification for the script set development control system. For example, the first data script set may include a collection of data values, data fields, the relationships among them, and the functions or operations that can be applied to the data.

At step 406, process 400 retrieves (e.g., using one or more components as described in FIG. 2) a second script set that has been automatically generated by the script validation platform. For example, the system may retrieve a second script set that has been automatically generated by the script validation platform, wherein the second script set defines a second workflow of script dependencies for inserting a dependency branch of the first workflow of script dependencies. In some embodiments, the second data script set may comprise a data organization, management, and storage format (e.g., as automatically selected by the system (e.g., using an artificial intelligence model)) that enables efficient access and modification that has been automatically generated by the script validation platform. For example, the second data script set may include a collection of data values, data fields, the relationships among them, and the functions or operations that can be applied to the data (e.g., as automatically selected by the system (e.g., using an artificial intelligence model)).

In some embodiments, the system may use one or more models to determine what dependency branches to test, modify, and/or what script attributes at those dependency branches to test and/or modify. For example, the system may receive an output of an artificial intelligence model, wherein the artificial intelligence model has been trained on historic performance level data that is labeled with script attributes at different dependency branches that resulted in respective performance levels. The system may select the dependency branch based on the output. In another example, the system may receive an output of an artificial intelligence model, wherein the artificial intelligence model has been trained on historic performance level data that is labeled with script attributes at different dependency branches that resulted in respective performance levels. The system may select a script attribute for the second script set based on the output.

At step 408, process 400 determines (e.g., using one or more components as described in FIG. 2) a dependency branch. For example, the system may determine, based on the second script set, the dependency branch of the first workflow of script dependencies for automatically generating the script validation assessment.

At step 410, process 400 generates (e.g., using one or more components as described in FIG. 2) the script validation assessment based on the first script set and the second script set. For example, the system may generate the script validation assessment based on the first script set and the second script set, wherein the script validation assessment indicates a performance level of the first application using the second script set. For example, the system may receive (e.g., via user interface 100 (FIG. 1A)) a user selection of the script validation assessment. Each script validation assessment may contain native data and also may link to other script sets. For example, the script validation assessment may be represented by a non-linear or linear data script set of nodes and edges.

In some embodiments, the system may determine a difference in a performance level of an application based on the use of different script sets. For example, the system may determine a difference in processing speed based on a first script set as compared to a second script set. By doing so, the system may determine which script sets optimize particular performance characteristics for an application. The system may express these differences using one or more quantitative (e.g., performance ratios, percentage differences, etc.) or qualitative measures (e.g., color coding, etc.). For example, the system may determine an initial performance level of the first application using the first script set. The system may determine the performance level of the first application using the second script set. The system may determine a difference between the initial performance level and the performance level. The system may determine the relationship based on the difference.

In some embodiments, the system may retrieve a script attribute from a script set. The script attribute may represent a characteristic of the script set, such as a data source used to perform a function at a dependency branch in a dependency workflow, a function performed at a dependency branch in a dependencies workflow, an algorithm performed at a dependency branch in a dependencies workflow, etc. For example, the system may determine a script attribute of the second script set, wherein the script attribute defines an alternative data source for serving the first workflow of script dependencies at the dependency branch. The system may execute the dependency branch using the script attribute. In another example, the system may determine a script attribute of the second script set, wherein the script attribute defines an alternative function for performing the first workflow of script dependencies at the dependency branch. The system may execute the dependency branch using the script attribute.

In some embodiments, the system may retrieve a script attribute from a script set. The script attribute may modify one or more portions of a workflow. For example, the script attribute may indicate a different order of dependencies in a workflow, a different weight or weighting factor to be applied to a result of a dependency, and/or other characteristics that may modify the workflow. For example, the system may determine a script attribute of the second script set, wherein the script attribute defines an alternative order for performing dependencies in the first workflow of script dependencies after the dependency branch. The system may execute the dependencies in the first workflow of script dependencies after the dependency branch in the alternative order.

For example, a dependency branch may represent a given function that is performed in the workflow. The result of that function may be used by subsequent functions (e.g., subsequent dependency branches in the workflow) as an input. The system may weight this input differently based on the script attribute. For example, the system may determine a script attribute of the second script set, wherein the script attribute defines an alternative weight for weighting a result of the dependency branch. The system may apply the alternative weight to the result.

In some embodiments, the script attribute may indicate a condition at which a dependency branch is taken (e.g., a function at the dependency branch is performed). For example, the script attribute may modify the condition and/or one or more characteristics of the condition. For example, the system may determine a script attribute of the second script set, wherein the script attribute defines an alternative condition for using the dependency branch of the first workflow of script dependencies. The system may determine that the alternative condition is met. The system may execute the dependency branch based on determining that the alternative condition is met.

In some embodiments, the script attribute may indicate a threshold frequency at which a dependency branch is taken.

For example, the script attribute may modify the number of times a validation operation, system status check, and/or other test is run. For example, the dependency branch may comprise a branch of the workflow used to report results to the script validation platform. The script attribute may adjust this frequency in order to increase the number of results, the frequency at which updated results are received, and/or at which data is collected to determine a result. For example, the system may determine a script attribute of the second script set, wherein the script attribute defines a threshold frequency for using the dependency branch of the first workflow of script dependencies. The system may determine that a current frequency corresponds to the threshold frequency. The system may execute the dependency branch based on determining that the current frequency corresponds to the threshold frequency.

In some embodiments, generating the script validation assessment based on the first script set and the second script set may comprise retrieving a dependency branch of the first script set for generating the script validation assessment. For example, the first script set may include a workflow of script dependencies for validating a previously validated script set. The system may select the dependency branch for use in providing the assessment data below. In some embodiments, the dependency branch comprises selecting a script set attribute for determining the performance level.

In some embodiments, the script validation assessment may comprise a benchmark script set based on the dataset of the second script set. The script validation assessment may then compare the benchmark script set and the second script set. For example, the benchmark script set may comprise a script set generated by the system based on the second script set data input. The second data input may comprise the data set upon which the second script set was trained, tested, and/or validated. The benchmark script set may also share one or more script set attributes with the second script set. However, the benchmark script set may also include different script set attributes as a result of the dependency branch that is followed. For example, the benchmark script set may include a script set attribute (e.g., a specific data preparation, algorithm, architecture, etc.) that differs from the second script set.

The script validation assessment may then generate the benchmark script set with the one or more different attributes. The different attributes may then result in a different performance level, plot view, etc. The differences between the script sets may then be compared (e.g., as described in FIGS. 1-3).

In some embodiments, the performance level may indicate an amount of risk in a script set. For example, the performance level may indicate a level of uncertainty that the outputs of a statistical script set are acceptable with respect to the real data-generating process. That is, the level of performance may indicate the level of uncertainty that the outputs of a statistical script set have enough fidelity to the outputs of the data-generating process that the objectives of the script set may be achieved.

At step 412, process 400 receives (e.g., using one or more components as described in FIG. 2) a user selection of the script validation assessment. For example, the system may receive (e.g., via user interface 100 (FIG. 1A)) a user selection of the script validation assessment. For example, the system may receive (e.g., via user interface 100 (FIG. 1A)) a user selection of a script set attribute. For example, a script set attribute may be selected from several script set attributes. Each script set attribute may be a basic unit of a data script set, such as a link between one or more script sets.

Each script validation assessment may contain data and may also link to other nodes. For example, the script validation assessment may be represented by a non-linear data script set of nodes and edges. In some embodiments, the system may implement links between nodes through pointers.

At step 414, process 400 generates (e.g., using one or more components as described in FIG. 2) for display, native data and assessment data. For example, the system may generate for display, on the user interface, native data, for the first script set and the second script set and assessment data that describes, in a human-readable format, a relationship between the native data for the first script set and the second script set. Additionally, or alternatively, the system may then receive a user modification to the source code of the second script set and store the modification to the source code.

For example, native data may comprise native data values or native data formats and may further comprise data that originates from and/or relates to a respective script set, the script validation platforms, and a respective plugin designed therefor. In some embodiments, native data may include data resulting from native code, which is code written specifically for the script set development control system, the script set, the script validation platforms, and/or a respective plugin designed therefor. For example, the native data for the first script set and the second script set may comprise respective raw data inputs and/or data outputs and plot views. In some embodiments, the system may determine a first performance characteristic of the first application using the first script set. The system may determine a second performance characteristic of the first application using the second script set. The system may determine a difference in the first performance characteristic and the second performance characteristic. The system may then determine the assessment data based on the difference.

For example, the assessment data may be presented in any format and/or representation of data that can be naturally read by humans (e.g., via a user interface such as user interface 100 (FIG. 1A)). In some embodiments, the assessment data may appear as a graphical representation of data. For example, the assessment data may comprise a graph or chart of the script validation assessment. In such cases, generating the graph may comprise determining a plurality of script sets for generating the script validation assessment and graphically representing a relationship of the plurality of script sets (e.g., as shown in FIG. 1A). In some embodiments, the relationship of the native data to the script validation assessment may comprise a graphical display describing a relationship of a result of a script set following a first workflow of script dependencies and a previously validated script set that follows a second workflow of script dependencies.

In some embodiments, the assessment data further comprises a recommendation for an adjustment to the second workflow of script dependencies. The system may recommend one or more adjustments to the second script set (e.g., the second workflow of script dependencies comprising the second script set) in order to reduce risk in the script set. For example, the system may generate a recommendation for an adjustment to the second script set data input or the second script set attribute. For example, the system may generate a recommendation of an alternative script setting technique (e.g., a different script set attribute) for use in the second script set. Additionally, or alternatively, the assessment data may further comprise an effect of the relationship on the performance level of the first application using the second script set. For example, the system may generate a script set attribute that describes an effect of the current script set.

In some embodiments, the system may allow a user to update and/or edit the assessment data. For example, the system may receive a user edit to the assessment data and then store the edited assessment data. The system may then generate for display the edited assessment data subsequently. For example, the system may allow users having a given authorization to edit assessment data subject to that authorization. In such cases, the assessment data may have read/write privileges. Upon generating the assessment data for display, the system may verify that a current user has one or more read/write privileges. Upon verifying the level of privileges, the system may grant the user access to edit the assessment data.

In some embodiments, the relationship of the native data to the script validation assessment comprises a graphical display comparing the first workflow of script dependencies to the second workflow of script dependencies. For example, as shown in user interface 100 (FIG. 1A), the system may generate a graph indicating a difference when using a first script set and a second script set.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed above could be used to perform one or more of the steps in FIG. 4.

FIG. 5 shows a flowchart of the steps involved in generating a script validation assessment in a script validation platform, in accordance with one or more embodiments. For example, process 500 may represent the steps taken by one or more devices, as shown in FIGS. 1-4. In some embodiments, process 500 may be combined with one or more steps of process 400 (FIG. 4).

At step 502, process 500 determines (e.g., using one or more components as described in FIG. 2) that the script validation assessment comprises a comparison of a first script set and the second script set. For example, in response to a user query (e.g., via user interface 100 (FIG. 1A)) to access a script validation assessment for a script validation platform, the system may determine the one or more script sets needed for comparison. To determine these, the system may input the user query into a database listing available script sets (and/or script set attributes and/or data types related to the script sets). The system may filter the available script sets to determine one or more script sets that may provide the script validation assessment.

At step 504, process 500 determines (e.g., using one or more components as described in FIG. 2) whether or not the first script set is located remotely. For example, if the system contains multiple project management servers, script sets, and data related to a single server. In some embodiments, the system may read in and build a merged workflow (e.g., a cross-server workflow) from remote issue links. This merged workflow may comprise a comparison and/or integration of multiple script sets for use in generating the script validation assessment. If process 500 determines that the first script set is located remotely, process 500 proceeds to step 506. If process 500 determines that the first script set is not located remotely, process 500 proceeds to step 510.

At step 506, process 500 accesses (e.g., using one or more components as described in FIG. 2) a first remote issue link. For example, the first remote issue link may be an identifier that uniquely identifies a remote application and/or a remote object within a remote system housing the first script set.

At step 508, process 500 retrieves (e.g., using one or more components as described in FIG. 2) the first script set. For example, in response to receiving the user request to access the script validation assessment, the system may determine that the script validation assessment comprises the first script set. In response to determining that the script validation assessment comprises the first script set, the system may access the first remote issue link to a first server housing the first script set. Through the first remote issue link, the system may retrieve (e.g., download, stream, and/or otherwise access through one or more API or database functions) the first script set.

At step 510, process 500 determines (e.g., using one or more components as described in FIG. 2) whether or not the second script set is located remotely. For example, similar to the first script set, the system may determine if the second script set is available locally or remotely. If process 500 determines that the second script set is located remotely, process 500 proceeds to step 512. If process 500 determines that the second script set is not located remotely, process 500 proceeds to step 516.

At step 512, process 500 accesses (e.g., using one or more components as described in FIG. 2) a second remote issue link. For example, the second remote issue link may be an identifier that uniquely identifies a second remote application and/or a second remote object within a second remote system housing the second script set. It should be noted that in some embodiments, the first and second script sets may be located in the same remote server. Furthermore, in some embodiments, the remote server may be a component of system 400 (FIG. 4).

At step 514, process 500 retrieves (e.g., using one or more components as described in FIG. 2) the second script set. For example, in response to receiving the user request to access the script validation assessment, the system may determine that the script validation assessment comprises the second script set. In response to determining that the script validation assessment comprises the second script set, the system may access the second remote issue link to a second server housing the second script set. Through the second remote issue link, the system may retrieve (e.g., download, stream, and/or otherwise access through one or more API or database functions) the second script set.

At step 516, process 500 determines (e.g., using one or more components as described in FIG. 2) whether or not the first and second script sets are automatically compared to generate the script validation assessment. For example, in some embodiments, script set automation may be used to reduce manual effort in maintaining items and running script set assessments. In such cases, the system may retrieve rules and/or determine dependency branches in hierarchies of dependencies supported by a script validation platform (or script set plugins). Exemplary dependencies may include pulling requests for script set data inputs and the script set attributes (e.g., which may pull algorithms and data sets specific to a determined script set) and "Add sub-dependencies" (e.g., which may pull in all sub-dependencies and/or automatically execute sub-dependencies for a script set). If process 500 determines that the first and second script sets are automatically compared to generate the script validation assessment, process 500 proceeds to step 518. If process 500 determines that the first and second script sets are not automatically compared to generate the script validation assessment, process 500 proceeds to step 522.

At step 518, process 500 retrieves (e.g., using one or more components as described in FIG. 2) a dependency branch. In some embodiments, the system may retrieve a standard dependency branch. Alternatively, the system may retrieve a custom dependency branch. For example, the system may select a dependency branch from a plurality of available dependency branches based on a type of one or more script sets. For example, the system may determine a first script set attribute for the script validation assessment. The system may then determine a second script set attribute that has been automatically generated by the script validation platform. The system may then determine a dependency branch for automatically generating the script validation assessment based on the second script set. For example, using the data inputs and script set attributes, the system may re-validate the second script set using the workflow of script dependencies in the first script set.

At step 520, process 500 applies (e.g., using one or more components as described in FIG. 2) a dependency branch. For example, the system may automatically generate the script validation assessment based on applying the dependency branch selected in step 518.

At step 522, process 500 receives (e.g., using one or more components as described in FIG. 2) user integration. For example, the system may receive user inputs (e.g., via user interface 100 (FIG. 1A)) by selecting a specific dependency (e.g., algorithm, comparison approach, etc.) that is used by the first script set. Alternatively, or additionally, the system may receive user inputs selecting a dependency branch for comparing one or more script sets and/or one or more portions of a script set.

At step 524, process 500 generates (e.g., using one or more components as described in FIG. 2) a script validation assessment. For example, the system may generate for display the script validation assessment in a user interface. In some embodiments, generating the script validation assessment may be an iterative process. For example, the system may generate a script set graph for the script validation assessment. The system may then determine script validation assessments (e.g., between the first and second script sets) based on the dependency branch selected in step 518 or based on the manual integration performed by a user in step 522.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method for integrating script development and script validation platforms based on detected dependency branches in script code.

2. The method of any one of the preceding embodiments, the method comprising: receiving, via a user interface, a user request to perform a script validation assessment on a first application using a script validation platform; retrieving a first script set for the first application, wherein the first script set defines a first workflow of script dependencies for the first application; retrieving a second script set that has been automatically generated by the script validation platform, wherein the second script set defines a second workflow of script dependencies for inserting at a dependency branch of the first workflow of script dependencies; determining, based on the second script set, the dependency branch of the first workflow of script dependencies for automatically generating the script validation assessment; generating the script validation assessment based on the first script set and the second script set, wherein the script validation assessment indicates a performance level of the first application using the second script set; receiving, via the user interface, a user selection of the script validation assessment; and in response to the user selection of the script validation assessment, generating for display on the user interface native data for the first script set and the second script set; and assessment data that describes, in a human-readable format, a relationship between the native data for the first script set and the second script set.

3. The method of any one of the preceding embodiments, wherein generating the script validation assessment based on the first script set and the second script set further comprises: determining an initial performance level of the first application using the first script set; determining the performance level of the first application using the second script set; determining a difference between the initial performance level and the performance level; and determining the relationship based on the difference.

4. The method of any one of the preceding embodiments, wherein generating the script validation assessment based on the first script set and the second script set further comprises: determining a script attribute of the second script set, wherein the script attribute defines an alternative data source for serving the first workflow of script dependencies at the dependency branch; and executing the dependency branch using the script attribute.

5. The method of any one of the preceding embodiments, wherein generating the script validation assessment based on the first script set and the second script set further comprises: determining a script attribute of the second script set, wherein the script attribute defines an alternative function for performing the first workflow of script dependencies at the dependency branch; and executing the dependency branch using the script attribute.

6. The method of any one of the preceding embodiments, wherein generating the script validation assessment based on the first script set and the second script set further comprises: determining a script attribute of the second script set, wherein the script attribute defines an alternative order for performing dependencies in the first workflow of script dependencies after the dependency branch; and executing the dependencies in the first workflow of script dependencies after the dependency branch in the alternative order.

7. The method of any one of the preceding embodiments, wherein generating the script validation assessment based on the first script set and the second script set further comprises:

determining a script attribute of the second script set, wherein the script attribute defines an alternative weight for weighting a result of the dependency branch; and applying the alternative weight to the result.

8. The method of any one of the preceding embodiments, wherein generating the script validation assessment based on the first script set and the second script set further comprises: determining a script attribute of the second script set, wherein the script attribute defines an alternative condition for using the dependency branch of the first workflow of script dependencies; determining that the alternative condition is met; and executing the dependency branch based on determining that the alternative condition is met.

9. The method of any one of the preceding embodiments, wherein generating the script validation assessment based on the first script set and the second script set further comprises: determining a script attribute of the second script set, wherein the script attribute defines a threshold frequency for using the dependency branch of the first workflow of script dependencies; determining that a current frequency corresponds to the threshold frequency; and executing the dependency branch based on determining that the current frequency corresponds to the threshold frequency.

10. The method of any one of the preceding embodiments, wherein retrieving the second script set that has been automatically generated by the script validation platform further comprises: receiving an output of an artificial intelligence model, wherein the artificial intelligence model has been trained on historic performance level data that is labeled with script attributes at different dependency branches that resulted is respective performance levels; and selecting the dependency branch based on the output.

11. The method of any one of the preceding embodiments, wherein retrieving the second script set that has been automatically generated by the script validation platform further comprises: receiving an output of an artificial intelligence model, wherein the artificial intelligence model has been trained on historic performance level data that is labeled with script attributes at different dependency branches that resulted in respective performance levels; and selecting a script attribute for the second script set based on the output.

12. The method of any one of the preceding embodiments, further comprising: in response to receiving the user request, determining that the script validation assessment comprises the second script set; and in response to determining that the script validation assessment comprises the second script set, accessing a first remote issue link to a first server housing the first script set; and a second remote issue link to a second server housing the first script set.

13. The method of any one of the preceding embodiments, further comprising: receiving a user modification to the source code of the second script set; and storing the modification to the source code.

14. The method of any one of the preceding embodiments, wherein generating for display the native data for the first script set and the second script set further comprises: determining a first performance characteristic of the first application using the first script set; and determining a second performance characteristic of the first application using the second script set.

15. The method of any one of the preceding embodiments, wherein generating for display the assessment data that describes the relationship between the native data for the first script set and the second script set further comprises: determining a difference in the first performance characteristic and the second performance characteristic; and determining the assessment data based on the difference.

16. A tangible, non-transitory, machine-readable medium storing instructions that, when executed by a data processing apparatus, cause the data processing apparatus to perform operations comprising those of any of embodiments 1-15.

17. A system comprising one or more processors; and memory-storing instructions that, when executed by the processors, cause the processors to effectuate operations comprising those of any of embodiments 1-15.

18. A system comprising means for performing any of embodiments 1-15.

What is claimed is:

1. A system for integrating script development and script validation platforms based on detected dependency branches in script code, comprising:
    one or more processors; and
    a non-transitory, computer-readable medium comprising instructions recorded thereon that, when executed by the one or more processors, causes operations comprising:
        receiving, via a user interface, a user request to perform a script validation assessment, on a first application, using a script validation platform;
        retrieving a first script set for the first application, wherein the first script set defines a first workflow of script dependencies for the first application;
        retrieving a second script set that has been automatically generated by the script validation platform, wherein the second script set defines a second workflow of script dependencies for inserting at a dependency branch of the first workflow of script dependencies;
        determining, based on the second script, the dependency branch of the first workflow of script dependencies for automatically generating the script validation assessment, wherein the script validation assessment determines a performance level of a script set attribute of the dependency branch;
        generating the script validation assessment based on the first script set and the second script set;
        in response to generating the script validation assessment, generating for display, on the user interface, a recommendation for an adjustment to the first workflow of script dependencies;
        receiving, via the user interface, a user selection accepting the recommendation; and
        in response to the user selection, generating for display, on the user interface, native data, for the first script set and the second script set, and assessment data that describes, in a human-readable format, a relationship between the native data for the first script set and the second script set.

2. A method for integrating script development and script validation platforms based on detected dependency branches in script code, comprising:
    receiving, via a user interface, a user request to perform a script validation assessment, on a first application, using a script validation platform;
    retrieving a first script set for the first application, wherein the first script set defines a first workflow of script dependencies for the first application;
    retrieving a second script set that has been automatically generated by the script validation platform, wherein the second script set defines a second workflow of script dependencies for inserting at a dependency branch of the first workflow of script dependencies;

determining, based on the second script set, the dependency branch of the first workflow of script dependencies for automatically generating the script validation assessment;

generating the script validation assessment based on the first script set and the second script set, wherein the script validation assessment indicates a performance level of the first application using the second script set;

receiving, via the user interface, a user selection of the script validation assessment; and in response to the user selection of the script validation assessment, generating for display, on the user interface, native data, for the first script set and the second script set, and assessment data that describes, in a human-readable format, a relationship between the native data for the first script set and the second script set.

3. The method of claim 2, wherein generating the script validation assessment based on the first script set and the second script set, further comprises:
 determining an initial performance level of the first application using the first script set;
 determining the performance level of the first application using the second script set;
 determining a difference between the initial performance level and the performance level; and
 determining the relationship based on the difference.

4. The method of claim 2, wherein generating the script validation assessment based on the first script set and the second script set, further comprises:
 determining a script attribute of the second script set, wherein the script attribute defines an alternative data source for serving the first workflow of script dependencies at the dependency branch; and
 executing the dependency branch using the script attribute.

5. The method of claim 2, wherein generating the script validation assessment based on the first script set and the second script set, further comprises:
 determining a script attribute of the second script set, wherein the script attribute defines an alternative function for performing the first workflow of script dependencies at the dependency branch; and
 executing the dependency branch using the script attribute.

6. The method of claim 2, wherein generating the script validation assessment based on the first script set and the second script set, further comprises:
 determining a script attribute of the second script set, wherein the script attribute defines an alternative order for performing dependencies in the first workflow of script dependencies after the dependency branch; and
 executing the dependencies in the first workflow of script dependencies after the dependency branch in the alternative order.

7. The method of claim 2, wherein generating the script validation assessment based on the first script set and the second script set, further comprises:
 determining a script attribute of the second script set, wherein the script attribute defines an alternative weight for weighting a result of the dependency branch; and
 applying the alternative weight to the result.

8. The method of claim 2, wherein generating the script validation assessment based on the first script set and the second script set, further comprises:
 determining a script attribute of the second script set, wherein the script attribute defines an alternative condition for using the dependency branch of the first workflow of script dependencies;
 determining that the alternative condition is met; and
 executing the dependency branch based on determining that the alternative condition is met.

9. The method of claim 2, wherein generating the script validation assessment based on the first script set and the second script set, further comprises:
 determining a script attribute of the second script set, wherein the script attribute defines a threshold frequency for using the dependency branch of the first workflow of script dependencies;
 determining that a current frequency corresponds to the threshold frequency; and
 executing the dependency branch based on determining that the current frequency corresponds to the threshold frequency.

10. The method of claim 2, wherein retrieving the second script set that has been automatically generated by the script validation platform, further comprises:
 receiving an output of an artificial intelligence model, wherein the artificial intelligence model has been trained on historic performance level data that is labeled with script attributes at different dependency branches that resulted in respective performance levels; and
 selecting the dependency branch based on the output.

11. The method of claim 2, wherein retrieving the second script set that has been automatically generated by the script validation platform, further comprises:
 receiving an output of an artificial intelligence model, wherein the artificial intelligence model has been trained on historic performance level data that is labeled with script attributes at different dependency branches that resulted in respective performance levels; and
 selecting a script attribute for the second script set based on the output.

12. The method of claim 2, further comprising:
 in response to receiving the user request, determining that the script validation assessment comprises the second script set; and
 in response to determining that the script validation assessment comprises the second script set, accessing:
  a first remote issue link to a first server housing the first script set; and
  a second remote issue link to a second server housing the first script set.

13. The method of claim 2, further comprising:
 receiving a user modification to a source code of the second script set; and
 storing the modification to the source code.

14. The method of claim 2, wherein generating for display the native data, for the first script set and the second script set, further comprises:
 determining a first performance characteristic of the first application using the first script set; and
 determining a second performance characteristic of the first application using the second script set.

15. The method of claim 14, wherein generating for display the assessment data that describes the relationship between the native data for the first script set and the second script set, further comprises:

determining a difference in the first performance characteristic and the second performance characteristic; and determining the assessment data based on the difference.

16. A non-transitory, computer-readable medium comprising instructions that, when executed by one or more processors, cause operations comprising:

receiving a user request to perform a script validation assessment, on a first application, using a script validation platform;

retrieving a first script set for the first application, wherein the first script set defines a first workflow of script dependencies for the first application;

retrieving a second script set that has been automatically generated by the script validation platform, wherein the second script set defines a second workflow of script dependencies for inserting at a dependency branch of the first workflow of script dependencies;

determining, based on the second script set, the dependency branch of the first workflow of script dependencies for automatically generating the script validation assessment;

generating the script validation assessment based on the first script set and the second script set, wherein the script validation assessment indicates a performance level of the first application using the second script set; and generating for display, based on the script validation assessment, native data, for the first script set and the second script set, and assessment data that describes, in a human-readable format, a relationship between the native data for the first script set and the second script set.

17. The non-transitory, computer-readable medium of claim 16, wherein generating the script validation assessment based on the first script set and the second script set, further comprises:

determining an initial performance level of the first application using the first script set;

determining the performance level of the first application using the second script set;

determining a difference between the initial performance level and the performance level; and determining the relationship based on the difference.

18. The non-transitory, computer-readable medium of claim 16, wherein generating the script validation assessment based on the first script set and the second script set, further comprises:

determining a script attribute of the second script set, wherein the script attribute defines an alternative data source for serving the first workflow of script dependencies at the dependency branch; and executing the dependency branch using the script attribute.

19. The non-transitory, computer-readable medium of claim 16, wherein generating the script validation assessment based on the first script set and the second script set, further comprises:

determining a script attribute of the second script set, wherein the script attribute defines an alternative function for performing the first workflow of script dependencies at the dependency branch; and executing the dependency branch using the script attribute.

20. The non-transitory, computer-readable medium of claim 16, wherein generating the script validation assessment based on the first script set and the second script set, further comprises:

determining a script attribute of the second script set, wherein the script attribute defines an alternative order for performing dependencies in the first workflow of script dependencies after the dependency branch; and executing the dependencies in the first workflow of script dependencies after the dependency branch in the alternative order.

\* \* \* \* \*